(12) United States Patent
Nanaumi

(10) Patent No.: US 7,726,757 B2
(45) Date of Patent: Jun. 1, 2010

(54) IMAGE FORMING APPARATUS AND INFORMATION PROCESSING METHOD

(75) Inventor: Yoshihito Nanaumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 11/469,931

(22) Filed: Sep. 5, 2006

(65) Prior Publication Data

US 2007/0058027 A1 Mar. 15, 2007

(30) Foreign Application Priority Data

Sep. 9, 2005 (JP) ............................. 2005-262983

(51) Int. Cl.
*H04N 1/034* (2006.01)
*B41J 29/38* (2006.01)
*G06F 9/00* (2006.01)
*G06F 13/00* (2006.01)

(52) U.S. Cl. ................................ 347/3; 347/5; 705/410; 710/104

(58) Field of Classification Search ................. 346/145; 399/81; 361/679.21–679.3; 705/401, 408, 705/410, 411; 358/1.15, 1.16; 347/129, 347/152, 170, 222, 245, 263, 352
See application file for complete search history.

(56) References Cited

U.S. PATENT DOCUMENTS

| | | | | |
|---|---|---|---|---|
| 6,741,269 B2 * | 5/2004 | Morikawa | ................... | 715/781 |
| 7,081,965 B2 * | 7/2006 | Taniguchi | ................... | 358/1.15 |
| 7,161,696 B2 * | 1/2007 | Yamamoto et al. | ......... | 358/1.15 |
| 7,443,406 B2 * | 10/2008 | Mohri | ........................ | 347/115 |
| 7,460,253 B2 * | 12/2008 | Osada | ........................ | 358/1.13 |
| 7,460,261 B2 * | 12/2008 | Itoh | ........................ | 358/1.15 |
| 2002/0054333 A1 * | 5/2002 | Yamamoto et al. | ......... | 358/1.15 |
| 2006/0232619 A1 * | 10/2006 | Otsuka et al. | ................... | 347/5 |
| 2007/0057978 A1 * | 3/2007 | Hagiwara | ...................... | 347/5 |

FOREIGN PATENT DOCUMENTS

JP  2003-127473  5/2003

\* cited by examiner

*Primary Examiner*—Stephen D Meier
*Assistant Examiner*—Rene Garcia, Jr.
(74) *Attorney, Agent, or Firm*—Cowan, Liebowitz & Latman, P.C.

(57) ABSTRACT

The object of the present invention is to easily select a file when a user prints. In order to achieve this object, according to this invention, an information processing method in an image forming apparatus which stores a printing history in a print process, includes the steps of displaying accessible files stored in a predetermined storage location, selecting one of the displayed files (step S701), extracting, based on the printing history, a file related to the selected file (steps S703 to S706), and printing an arbitrary file of the selected and extracted files (steps S708 and S709).

15 Claims, 8 Drawing Sheets

FIG. 6

| 601 | 602 | 603 | 604 | 605 | 606 | 607 | 608 | 609 |
|---|---|---|---|---|---|---|---|---|
| LOG ID | USER NAME | PRINTED DATA NAME | STORAGE LOCATION | PRINTING START TIME | PRINTING END TIME | PRINTED DATA SIZE | NUMBER OF COPIES | PRINTING PAPER SIZE |
| 610 0001 | AAA | MATERIAL FOR PROMOTION CONFERENCE OF PROJECT A | ¥¥DOCUMENT MANAGEMENT SYSTEM¥ FolderA¥ | 2005/ 06/09/ 9:19:45 | 2005/ 06/09/ 9:19:50 | 300k | 2 | A4 |
| 611 0002 | AAA | SCHEDULE OF PROJECT A | ¥¥IMAGE FORMING APPARATUS B_HDD¥ FolderE¥SCHEDULE MANAGEMENT¥ | 2005/ 06/09/ 9:20:15 | 2005/ 06/09/ 9:20:17 | 126k | 1 | A4 |
| 612 0003 | BBB | ×××  | ¥¥FILE SERVER¥¥¥ | 2005/ 06/09/ 9:20:30 | 2005/ 06/09/ 9:20:40 | 500k | 2 | B5 |
| 613 0004 | AAA | ESTIMATE SHEET OF MANHOURS OF PROJECT A | ¥¥IMAGE FORMING APPARATUS A_HDD¥ FolderC¥PROJECT A¥ | 2005/ 06/09/ 9:20:50 | 2005/ 06/09/ 9:20:55 | 422k | 2 | A4 |

600

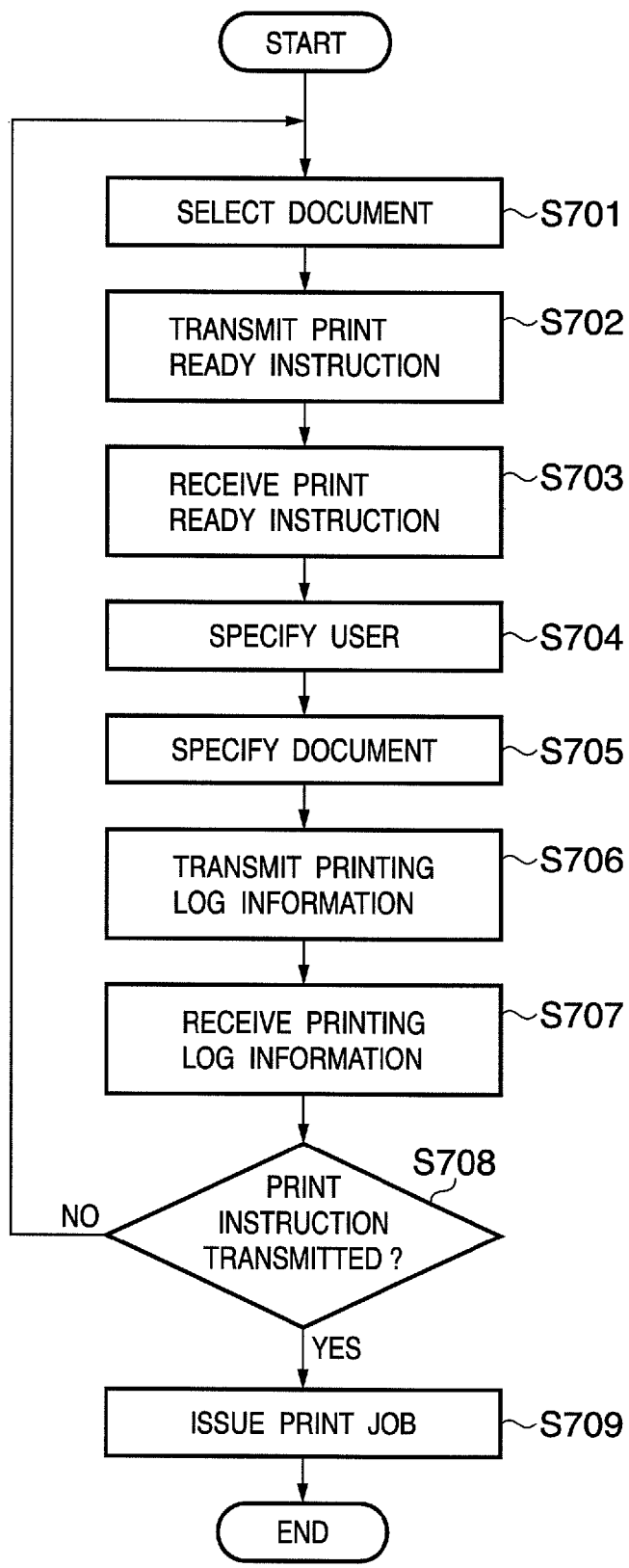

IMAGE FORMING APPARATUS AND INFORMATION PROCESSING METHOD

BACKGROUND OF THE INVENTION

1. Field of the Invention

The present invention relates to an information processing technique in an image forming apparatus having a print function of acquiring a file from a predetermined storage location, and printing the acquired file.

2. Description of the Related Art

Conventionally, an image forming apparatus such as an MFP (Multi Function Peripheral) has a storage device such as a hard disk to store various kinds of information. Actually, in order to cope with various objects, the image forming apparatus stores a print target document file (to be merely referred to as a "document" hereinafter), temporarily saves spooled print data, and saves printed data.

Generally, the image forming apparatus is communicably connected to a plurality of devices via a network. With this configuration, the image forming apparatus can acquire, via the network, information not only from the image forming apparatus itself but also from each device on the network, and print the acquired information.

In the image forming apparatus having these functions, various proposals have been made in association with the information processing technique of acquiring a document from a predetermined storage location and printing the acquired document. For example, Japanese Patent Laid-Open No. 2003-127473 discloses an arrangement in which a user selects, from a past printing history, a print target document and print condition setting which are stored in a predetermined storage location.

However, even when the user tries to select a desired document from the past printing history, it is difficult to find the desired document if the past printing history contains an enormous amount of data. This imposes a heavy load on the user.

SUMMARY OF THE INVENTION

The present invention has been made in consideration of the above problem, and has as its object to provide an image forming apparatus having a print function of acquiring a file from a predetermined storage location and printing the acquired file to easily select the file.

In order to achieve the above-described object, the image forming apparatus according to the present invention has the following arrangement. That is, an image forming apparatus comprises printing history storage unit configured to store a printing history in a print process, first display unit configured to display accessible files stored in a predetermined storage location, selection unit configured to select one of the files displayed by the first display unit, extraction unit configured to extract, based on the printing history, a file related to the file selected by the selection unit, and printing unit configured to print the file selected by the selection unit, and the file extracted by the extraction unit.

According to the present invention, in an image forming apparatus having a print function of acquiring a file from a predetermined storage location and printing the acquired file, the user can easily select the file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows a table which contains printing history information;

FIG. 7 is a flowchart showing the sequence until an operator transmits a print instruction from the operation unit.

DESCRIPTION OF THE EMBODIMENT

Preferred embodiments of the present invention will now be described in detail in accordance with the accompanying drawings.

First Embodiment

Entire Configuration of Image Forming System

Figure 1:
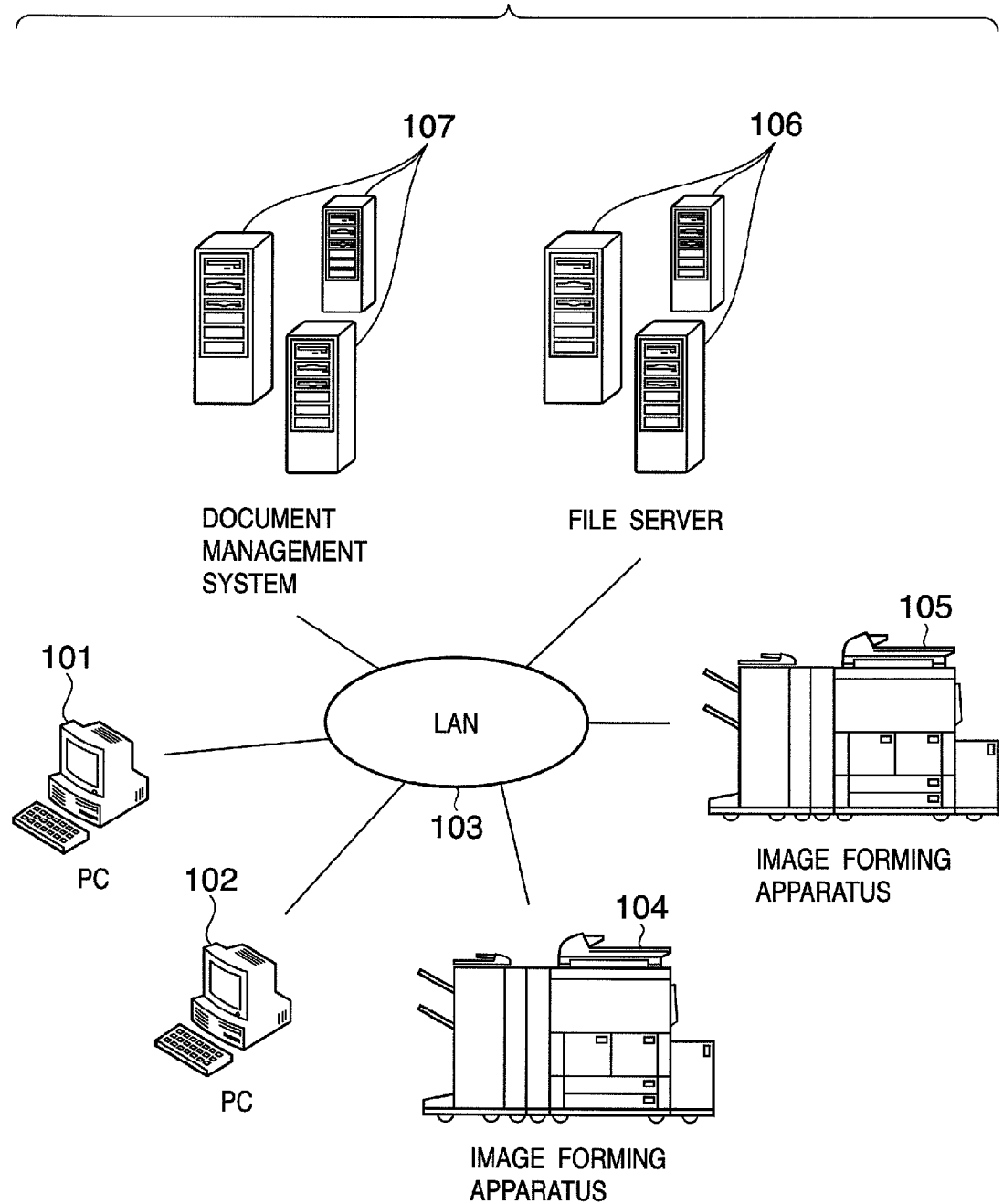
FIG. 1 is a view showing an example of an image forming system including an image forming apparatus according to the first embodiment of the present invention.

FIG. 1 is a view showing an example of an image forming system including an image forming apparatus according to the first embodiment of the present invention.

Referring to FIG. 1, reference numeral 103 denotes a LAN (Local Area Network). Reference numerals 101 and 102 denote computer apparatuses serving as printing clients each of which has a hardware resource of a so-called PC (personal computer). Reference numerals 104 and 105 denote image forming apparatuses which are communicably connected to the other devices via the LAN 103. Reference numeral 106 denotes a file server which stores various kinds of data. Reference numeral 107 denotes a document management system which stores documents.

Note that the devices connected to the LAN 103 are communicably connected to each other in accordance with a predetermined protocol. The printing client 101 loads a system resource such as a printer driver from a hard disk (not shown) or the like onto a RAM. When an application issues a print request, the print control window of the printer driver is displayed to accept the print request from a user.

<Description of Image Forming Apparatus>

Figure 2:
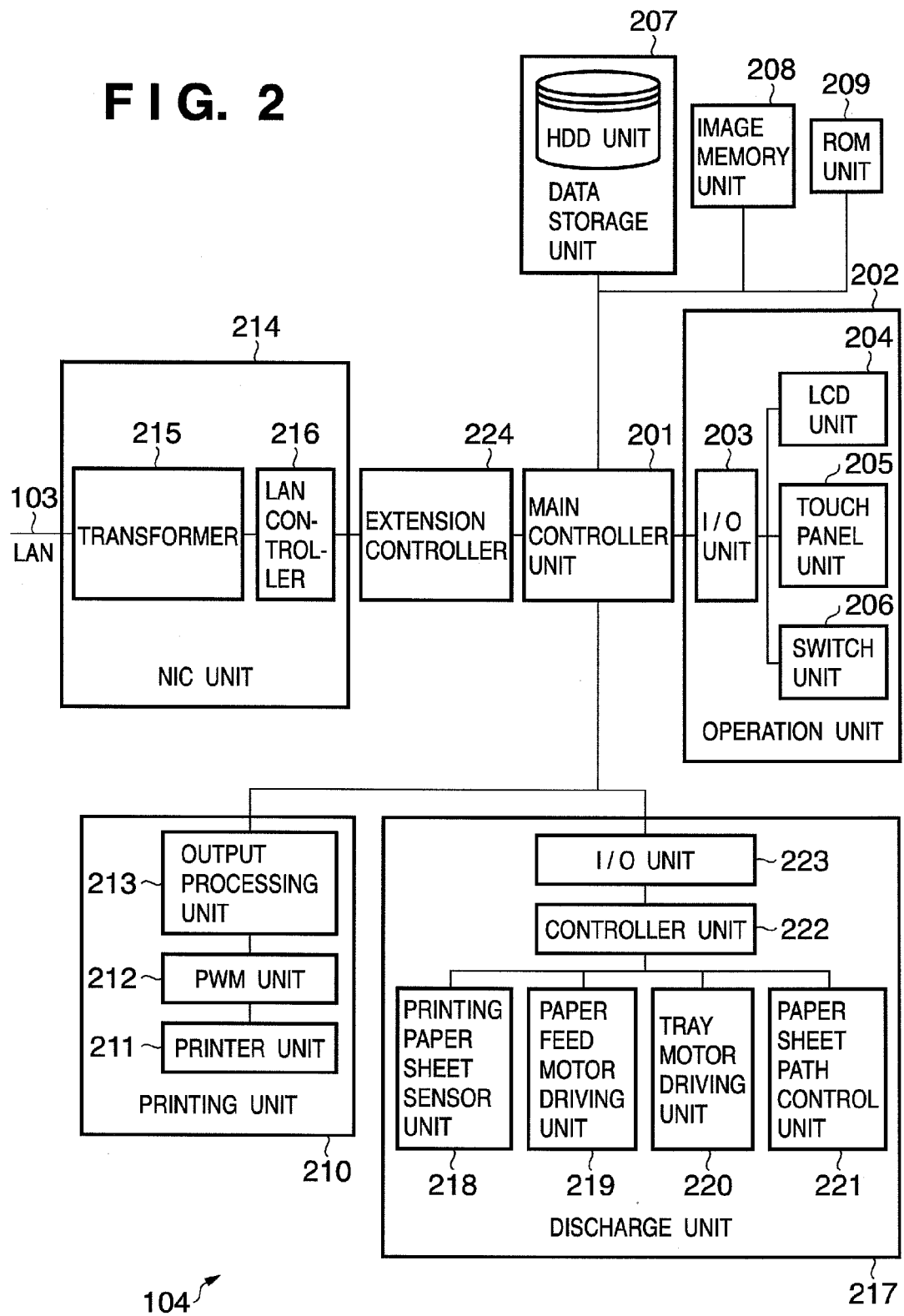
FIG. 2 is a block diagram showing a functional arrangement of the image forming apparatus according to the first embodiment of the present invention.

The arrangement of the image forming apparatus 104 according to the first embodiment of the present invention will be described with reference to FIG. 2. Referring to FIG. 2, reference numeral 201 denotes a main controller unit which controls overall the image forming apparatus 104. Reference numeral 202 denotes an operation unit which an operator uses to operate the image forming apparatus 104.

Reference numeral 203 denotes an I/O unit via which the operation unit 202 communicates with the main controller unit 201. Reference numeral 204 denotes an LCD unit which provides information to the operator, and displays a virtual switch to accept an instruction from the operator.

Reference numeral 205 denotes a touch panel unit which senses an operator's operation for the virtual switch displayed on the LCD unit 204. Reference numeral 206 denotes a switch physically arranged to be operated by the operator.

Reference numeral 207 denotes a data storage unit serving as a storage area for storing print data and program or as a data cache area. Reference numeral 208 denotes an image memory unit used to render and process the print data.

Reference numeral 224 denotes an expansion controller used for feature expansion of the image forming apparatus 104. Reference numeral 214 denotes an NIC (Network Interface Card) unit which is added to the image forming apparatus 104 via the expansion controller 224.

Reference numeral 216 denotes a LAN controller which monitors communication packets transferred through the LAN 103, and controls to receive a communication packet related to the image forming apparatus 104 and transmit information as a communication packet from the image forming apparatus 104 to the LAN 103. Reference numeral 215 denotes a transformer which transforms a voltage to make physical communication between the image forming apparatus 104 and the LAN 103.

Reference numeral 210 denotes a printing unit which prints print data on a printing paper sheet serving as a print medium. Reference numeral 213 denotes an output processing unit which executes gamma conversion, edge emphasis, smoothing, and the like to correct the print data from the main controller unit 201 into data suitable for printing on the printing paper sheet.

Reference numeral 212 denotes a PWM (Pulse Width Modulation) unit which converts the print data processed by the output processing unit 213 into a pulse signal which represents a timing of driving a laser beam. Reference numeral 211 denotes a printer unit which prints the print data on the printing paper sheet based on a signal supplied by the laser beam.

Reference numeral 217 denotes a discharge unit which discharges a paper sheet printed by the printing unit 210, outside the image forming apparatus 104. Reference numeral 223 denotes an I/O unit via which the discharge unit 217 communicates with the main controller unit 201.

Reference numeral 222 denotes a controller unit which controls the discharge unit 217. Reference numeral 218 denotes a printing paper sheet sensor unit which monitors the flow of the paper sheets passing through the discharge unit 217. Reference numeral 219 denotes a paper feed motor driving unit which drives a paper feed motor to feed the paper sheet. Reference numeral 220 denotes a tray motor driving unit which drives a discharge tray. Reference numeral 221 denotes a paper sheet path control unit which controls the flow of the printing paper sheets.

<Description of Data Storage Unit>

Figure 3:
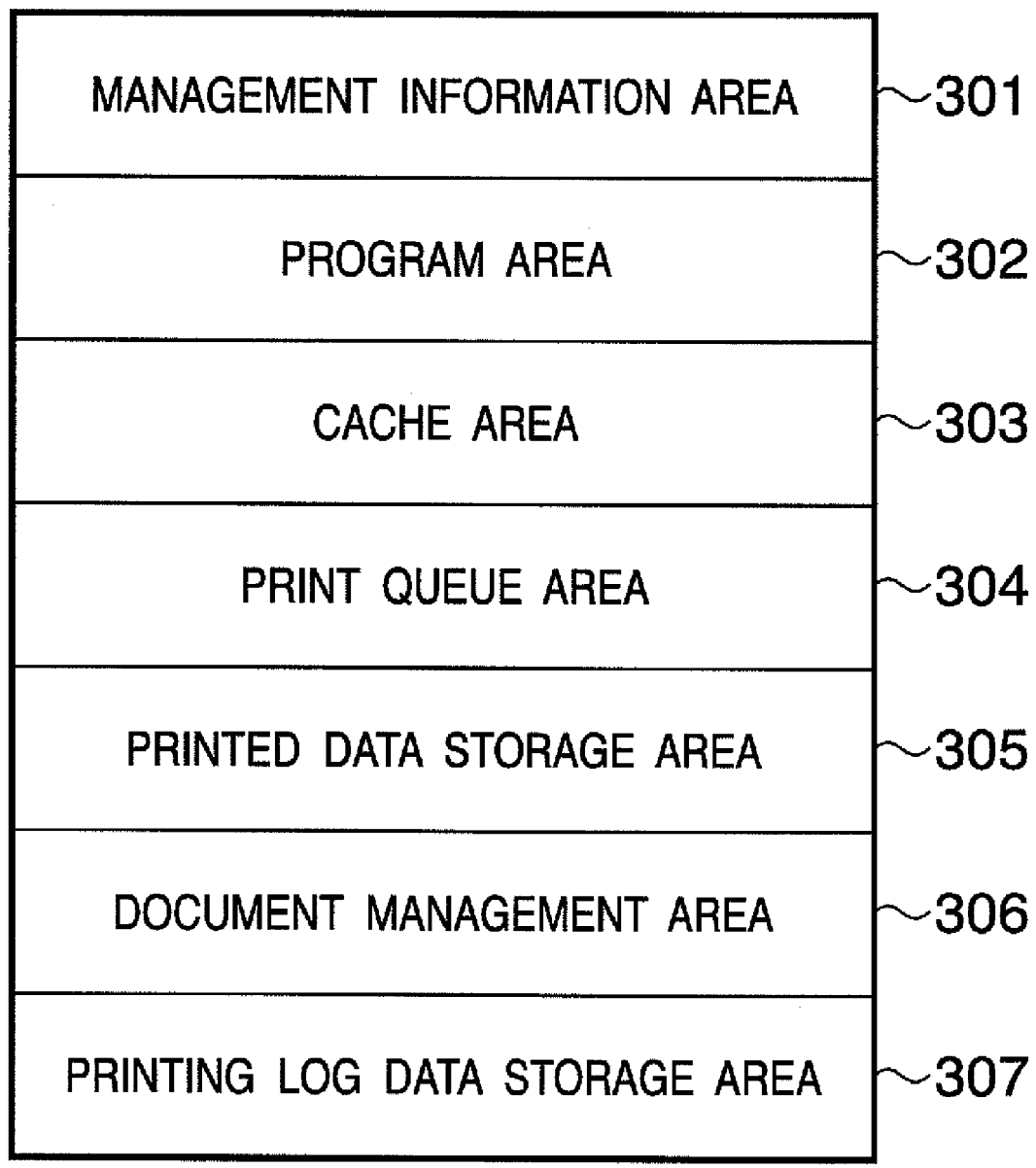
FIG. 3 is a view showing the structure of a data storage unit divided for each purpose.

FIG. 3 is a view showing the structure of the data storage unit 207 divided for each purpose. In FIG. 3, reference numeral 301 denotes a management information area which stores management information of the data storage unit 207.

Reference numeral 302 denotes a program area which stores a program for controlling the image forming apparatus 104. Reference numeral 303 denotes a cache area which can be used as a saving area for temporarily saving data during processing of the main controller unit 201.

Reference numeral 304 denotes a print queue area which can be used as a spool area for unprinted data. Reference numeral 305 denotes a printed data storage area which stores printed data to be reused. Reference numeral 306 denotes a document management area which stores various kinds of documents such as an application document and an image document (e.g., a FAX document and scan document). Reference numeral 307 denotes a printing history data storage area which stores a printing history generated in printing.

<First Display Window of Operation Unit>

Figure 4:
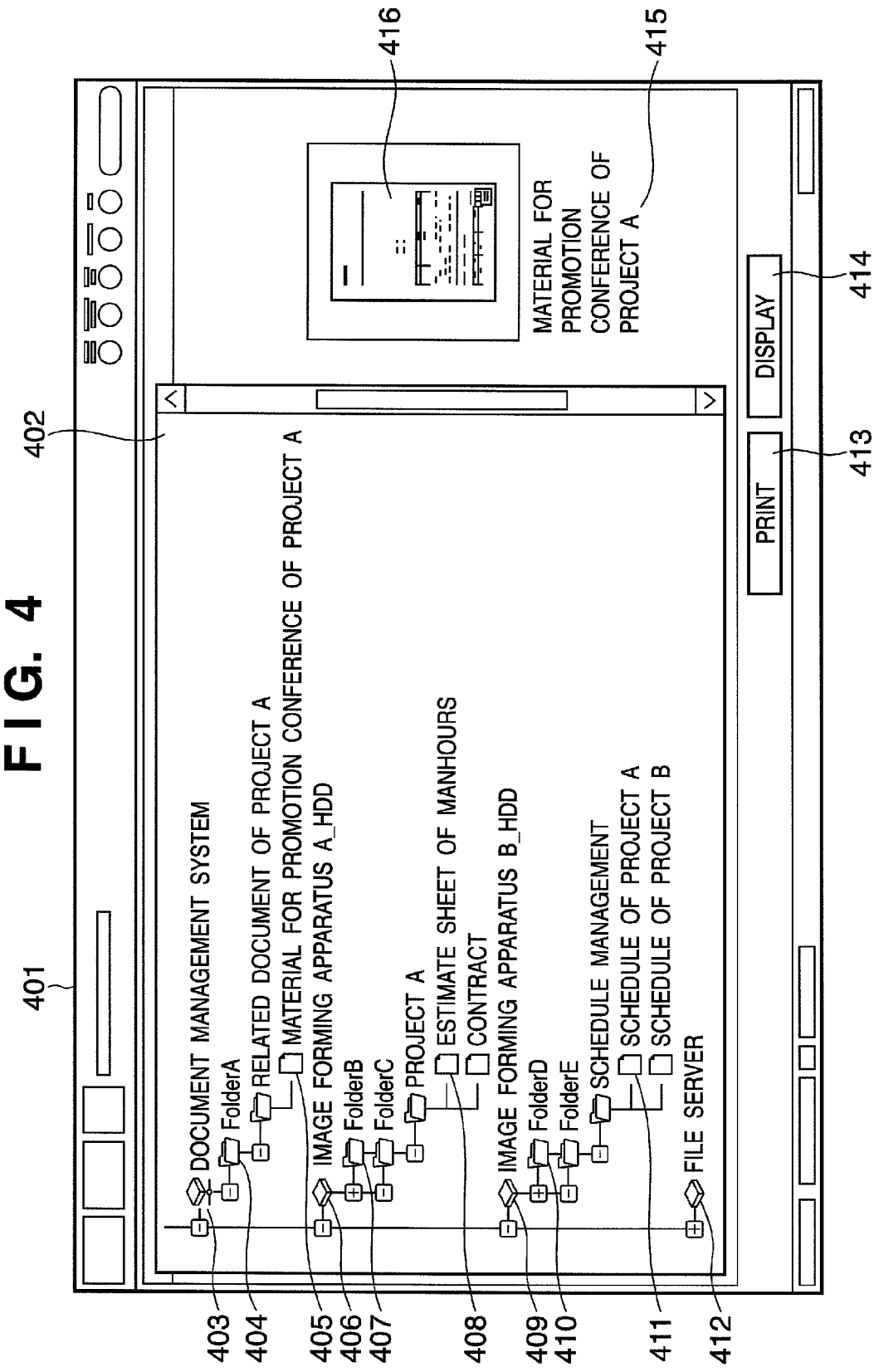
FIG. 4 is a view for explaining the display window of an operation unit.

FIG. 4 is a view for explaining a display window on the LCD unit 204 of the operation unit 202. Reference numeral 401 denotes a document selection window which provides information to an operator, and displays a virtual switch, in the image forming apparatus 104. The document selection window 401 also serves as the touch panel unit 205 to sense an operator's operation for the virtual switch displayed on the LCD unit 204.

Reference numeral 402 denotes a document display portion which displays documents stored in the document management area 306 of the image forming apparatus 104, and the document management system 107 and file server 106 connected via the LAN 103.

Reference numeral 403 denotes a "document management system" icon serving as a pointer to the document management system 107. Reference numeral 404 denotes a folder (Folder A) icon in the document management system 107, which serves as a pointer to the folder (Folder A) in the document management system 107.

Reference numeral 405 denotes a document icon in the document management system 107, which serves as a pointer to a document stored in the document management system 107. In this case, the document name is "Material for Promotion Conference of Project A". In the document management system 107, documents are managed in a hierarchical structure with folders and documents.

Reference numeral 406 denotes an "image forming apparatus" icon serving as a pointer to the document management area 306 of the image forming apparatus 104. Reference numeral 407 denotes a folder icon in the image forming apparatus 104, which serves as a pointer to the folder (Folder B) in the image forming apparatus 104. Reference numeral 408 denotes a document icon in the image forming apparatus 104, which serves as a pointer to a document (Estimate Sheet of Man-hours) stored in the image forming apparatus 104. In the document management area 306 of the image forming apparatus 104, documents are managed in a hierarchical structure with folders and documents.

Reference numeral 409 denotes an "image forming apparatus" icon serving as a pointer to the document management area of the image forming apparatus 105. The image forming apparatus 104 is connected to the image forming apparatus 105 via the LAN 103 using the NIC unit 214.

Reference numeral 410 denotes a folder icon in the image forming apparatus 105, which serves as a pointer to the folder (Folder D) in the image forming apparatus 105. Reference numeral 411 denotes a document icon in the image forming apparatus 105, which serves as a pointer to a document (Schedule of Project A) stored in the image forming apparatus 105. Reference numeral 412 denotes a "file server" icon which serves as a pointer to the file server 106.

When the operator touches one of the icons on the document display portion 402, folders and documents of a lower hierarchy are displayed. Reference numeral 416 denotes a document thumbnail display portion which displays the thumbnail of the document selected by the operator. Reference numeral 415 denotes a document name display portion which displays the name of the document displayed on the document thumbnail display portion 416.

Reference numeral 413 denotes a virtual switch on the LCD unit 204. When the operator presses the virtual switch 413 ("print" switch), a "print ready instruction" is transmitted to the main controller unit 201.

Reference numeral 414 denotes a virtual switch on the LCD unit 204. When the operator presses the virtual switch 414 ("display" switch), the thumbnail of the document selected on the document display portion 402 is displayed on the document thumbnail display portion 416.

<Second Display Window of Operation Unit>

Figure 5:
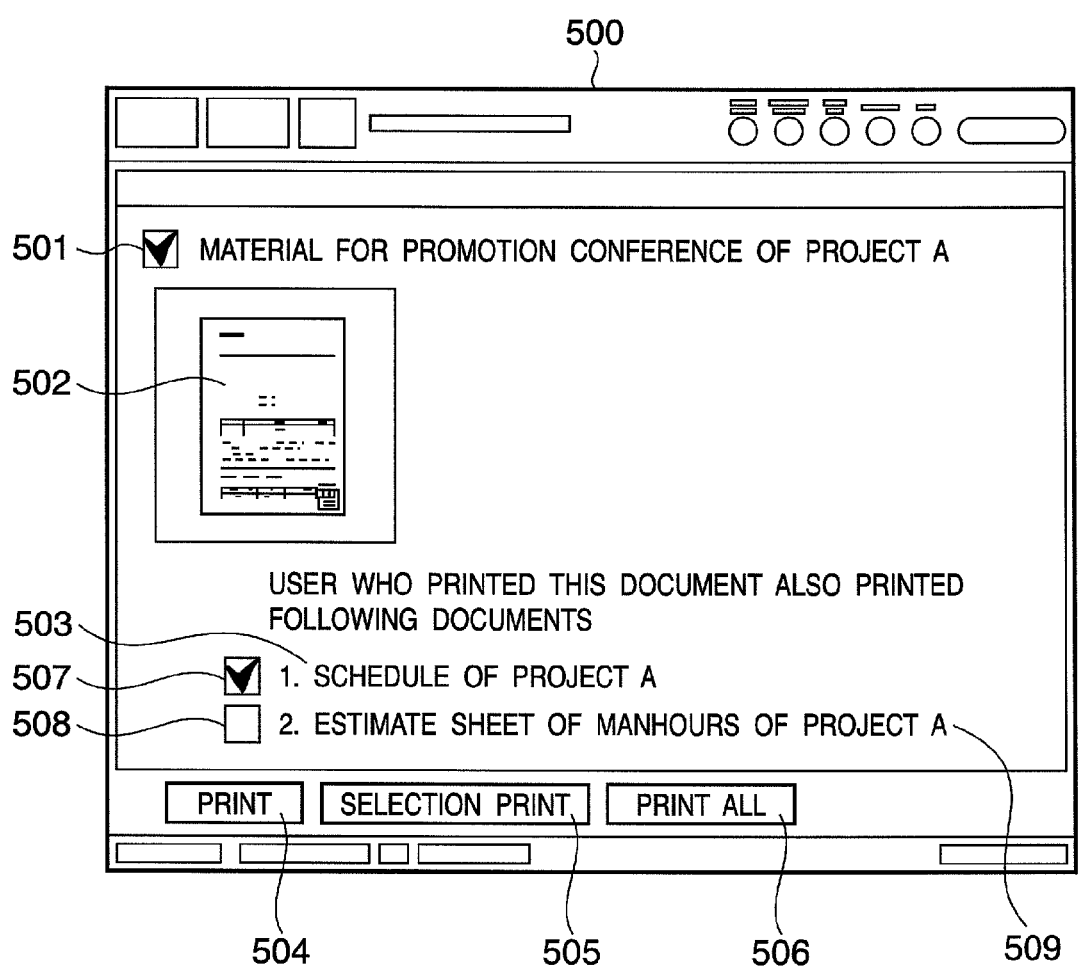
FIG. 5 is a view for explaining the display window of the operation unit.

FIG. 5 is a view for explaining a window displayed on the LCD unit 204 of the operation unit 202, and showing an example of a window displayed when pressing the virtual switch 413 ("print" switch) shown in FIG. 4.

Reference numeral 500 denotes a related document display selection window. Reference numeral 502 denotes the thumbnail of the document selected on the document selection window 401 by the operator, and displayed on the document thumbnail display portion 416 upon pressing the print switch 413.

Reference numerals 501, 507, and 508 denote check boxes for inputting marks to determine whether the corresponding documents are selected. Reference numerals 503 and 509 denote the document names of past printed documents of a user who printed the document of the thumbnail 502. These documents are extracted from the printing history and displayed. In this case, it is preferable to extract the documents which were printed within the same time zone as the document of the thumbnail 502 by the user in the past. However, this extraction criterion may be changed as needed. That is, documents to be extracted need not be those printed in the same time zone. One or two documents each printed before and after the document of the thumbnail 502 may be extracted. When a plurality of documents are combined and printed, the combined documents may be extracted. The number of documents to be extracted can also be changed as needed.

Reference numeral 504 denotes a "print" switch which is a virtual switch for issuing an instruction to print the thumbnail 502. Reference numeral 505 denotes a "selection print" switch which is a virtual switch for issuing an instruction to print the documents whose check boxes 501, 507, and 508 are checked.

Reference numeral 506 denotes a "print all" switch which is a virtual switch for issuing an instruction to simultaneously print all of the displayed documents.

Note that the display window shown in FIG. 5 is merely an example. In place of the operation switches shown in FIG. 5, one print switch may have the functions of "print", "selection print", and "print all" in accordance with the presence/absence of marks in the check boxes.

<Printing History>

FIG. 6 is a table which contains printing histories. Referring to FIG. 6, reference numeral 600 denotes a printing history table which displays printing history information written in the printing history data storage area 307.

Reference numeral 601 denotes a log ID which is assigned a numerical value unique for each print job. The numerical value is incremented by one for each print process. Reference numeral 602 denotes a name of user who printed, which represents the name of a user who issued a print instruction. Reference numeral 603 denotes a printed data name which represents the name of a printed document. Reference numeral 604 denotes a storage location which represents the path of a location for storing the printed data.

Reference numeral 605 denotes a printing start time which represents a time at which the print process started. Reference numeral 606 denotes a printing end time which represents a time at which the print process ended. Reference numeral 607 denotes a printed data size which represents the data size of a document. Reference numeral 608 denotes a number of copies which represents the number of paper sheets printed based on the print job. Reference numeral 609 denotes a printing paper size which represents the size of a printed paper sheet.

A "log ID 0001" (610) corresponds to printing history information generated in printing the document 405 (printed data name: Material for Promotion Conference of Project A). A "log ID 0002" (611) corresponds to printing history information generated in printing the document 411 (printed data name: Schedule of Project A). A "log ID 0003" (612) corresponds to printing history information generated in printing the document 412 (printed data name: xxx).

The printing history table 600 is stored in the printing history data storage area 307. The printing history table 600 is invoked by the main controller unit 201 in printing, to record the printing history information in the printing history table 600 after printing.

<Flow of Processing Until Operator Transmits Document Print Instruction from Operation Unit 202>

The sequence until the operator transmits a print instruction from the operation unit 202 in the image forming apparatus 104 will be described below with reference to the flowchart shown in FIG. 7.

FIG. 7 is a flowchart showing an example of a data processing sequence in the image forming apparatus 104 according to the first embodiment of the present invention, and corresponds to the data processing sequence until the operator transmits the document print instruction from the operation unit 202.

When the operator operates the operation unit 202 of the image forming apparatus 104 to display the document selection window 401, a print target document is selected in step S701. Note that in order to select the document, the operator selects a document icon (for example, "Material for Promotion Conference of Project A" document icon 405) on the document display portion 402.

A "print ready instruction" for the print target document is transmitted in step S702. The print ready instruction contains document specification information (printed data name 603, storage location 604, and printed data capacity 607) for uniquely specifying the document selected in step S701.

In step S702, the print ready instruction is transmitted when the operator presses the virtual switch 413 on the document display portion 402. Note that the operation unit 202 transmits the print ready instruction to the main controller unit 201.

In step S703, the main controller unit 201 receives the print ready instruction. Upon reception of the print ready instruction, the main controller unit 201 reads out the printing history table 600 from the printing history data storage area 307 of the data storage unit 207. In step S704, the main controller unit 201 finds the printing history information of the printed document which is specified from the printing history table 600 in accordance with the document specification information. Accordingly, the main controller unit 201 specifies a user who instructed to print. More specifically, the main controller unit 201 finds the log ID 610 instructed by a user AAA to print.

In step S705, the printing history information is specified, which contains the user AAA specified in step S704 as the name of user who printed. More specifically, the log IDs 610, 611, and 613 are specified, each of which contains the user name AAA specified in step S704 as the name of user who printed.

In step S706, the pieces of printing history information specified in step S705 (printed data name 603, storage location 604, and printed data capacity 607) are transmitted in correspondence with the print ready instruction.

In step S707, the pieces of printing history information transmitted from the main controller unit 201 are received to display data on the operation unit 202 based on the received printing history information. For example, the related document display selection window 500 is displayed based on the printing history information transmitted in step S706.

When the operator issues a print instruction in step S708, the operation unit 202 transmits a print job to the main controller unit 201 in step S709. If the operator issues no print instruction in step S708, the flow returns to step S701.

<Print Data Process after Reception of Print Instruction from Operation Unit>

The sequence until the image forming apparatus 104 receives the print job from the operator to print the print data on a printing paper sheet as a print medium based on the received print job will be described below with reference to the flowchart shown in FIG. 8.

Figure 8:
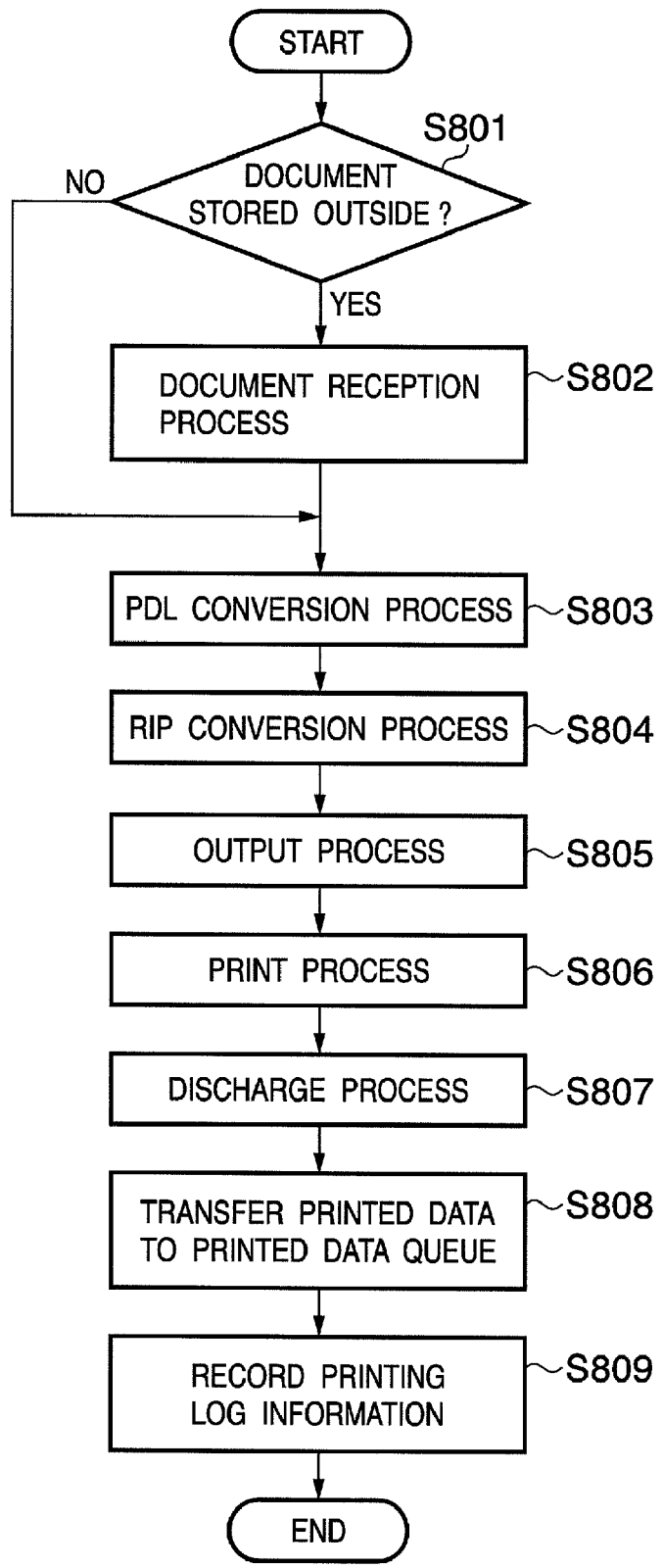
FIG. 8 is a flowchart showing the sequence until the operator transmits a print job to print a document on a printing paper sheet as a print medium based on the transmitted print job.

FIG. 8 is a flowchart showing an example of a data processing sequence in the image forming apparatus 104 according to the first embodiment of the present invention. More specifically, FIG. 8 is a flowchart showing a sequence until the main controller unit 201 in the image forming apparatus 104 receives a print job from the operation unit 202 to print a document on a printing paper sheet based on the received print job.

In step S801, it is determined whether the print target document is stored in the data storage unit 207 of the image forming apparatus 104 or the data storage unit of an external device.

If it is determined that the print target document is stored in the data storage unit of the external device, a communication is made in accordance with a communication protocol (TCP/IP protocol) via the LAN 103 in step S802 to temporarily store the document in the cache area 303 of the image forming apparatus 104.

In step S803, the main controller unit 201 executes data conversion for the document to convert the document into PDL (Page Description Language). The cache area 303 stores the converted document.

In step S804, the main controller unit 201 executes a RIP (Raster Image Processing) for the PDL data spooled in the cache area 303, to convert the PDL data into raster image data.

The generated raster image data is rendered in the image memory 208. In step S805, the output processing unit 213 of the printing unit 210 executes output processes such as gamma conversion, edge emphasis, and smoothing in order to correct the raster image data to data suitable for printing on the printing paper sheet. In addition, the PWM unit 212 converts, into a laser driving signal, the raster image data which has been converted into the data suitable for printing. The obtained data is transmitted to the printer unit 211.

In step S06, the printer unit 211 executes a print process for printing the printing paper sheet in accordance with the laser driving signal.

When the raster image data is completely printed, the printed paper sheet is conveyed to the discharge unit 217 to be discharged in step S807.

In the discharge unit 217, the controller unit 222 which controls the discharge device communicates with the main controller unit 201 via the I/O unit 223, thereby controlling various discharge processes. On the other hand, the controller unit 222 conveys the printed paper sheet by using the paper feed motor driving unit 219, thereby controlling the flow of the printed paper sheet using the paper sheet path control unit 221. While the printing paper sheet sensor unit 218 monitors the flow of the printed paper sheet, the controller unit 222 controls the tray motor driving unit 220 to discharge the printed paper sheet to an arbitrary tray.

The print process ends as described above, the main controller unit 201 transfers the printed data from a spooler (print data queue) to a printed data queue in the data storage unit 207 in step S808. This printed data queue is provided to omit additional external communication and data conversion in printing the data printed in the past again. Based on a remote instruction from the printing client 101 and an instruction from the operation unit 202 in the image forming apparatus 104, the operator can speedily reprint again, on a print medium, the printed data saved in the printed data queue.

Subsequently, in step S809, the main controller unit 201 records the printing history information in the printing history table 600 in order to store the printing history information, and the process ends.

The printing history table 600 is created in the printing history data storage area 307 of the data storage unit 207. This table stores printing attribute information as the printing history information, such as the name of user who printed, the print data name, the print start time, the print end time, the print data size, the number of copies, the printing paper sheet size, and the comment for the print data.

As is apparent from the above description, according to this embodiment, when the user selects a predetermined document, documents (the other documents instructed to be printed by the user who printed the selected document in the past) related to the selected document can be automatically selected from the printing history table, and displayed. As a result, the user can select a desired document from the displayed documents (without selecting the desired document from a large amount of printing history information), thus improving user's convenience to select a file for printing.

Note that in this embodiment, documents instructed to be printed by a user in the past are displayed as the related documents. However, the present invention is not limited to this. For example, documents each of which has items expected to be same as or closely relevant to the selected document may be displayed by using, as a key, other items (print data name, storage location, print date, and the like) in the printing history table 600. Furthermore, documents may be defined as documents closely relevant to each other based on a transmission log in place of the printing log. For example, a plurality of documents transmitted at the same time by an email function or the like may be defined as documents closely relevant to each other. Additionally, a plurality of documents sequentially stored within a predetermined period of time in the data storage unit 207 may be defined as documents closely relevant to each other. In place of such methods, various methods can be employed to determine the relationship among a plurality of documents.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for implementing the functions of the above-described embodiments to a system or an apparatus, and causing the computer (or a CPU or an MPU) of the system or the apparatus to read out and execute the program codes stored in the storage medium. In this case, the program codes read out from the storage medium implement the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262983, filed on Sep. 9, 2005, which is hereby incorporated by reference herein in its entirety.

What is claimed is:

1. An image forming apparatus comprising:
   a printing history storage unit configured to store a printing history of a print process;
   a first display unit configured to display accessible files stored in a predetermined storage;
   a selection unit configured to select a file to be printed among the files displayed by said first display unit;
   an extraction unit configured to extract, based on the printing history, a file related to the file selected by said selection unit in accordance with the selection of the file; and
   a printing unit configured to print the file selected by said selection unit, and the file extracted by said extraction unit.

2. The apparatus according to claim 1, further comprising:
   a second display unit configured to display the file extracted by said extraction unit, and
   a setting unit configured to set a print target file of the file selected by said selection unit, and the file displayed by said second display unit,
   wherein said printing unit prints the file set by said setting unit.

3. The apparatus according to claim 2, wherein said setting unit further comprises an "all setting" unit configured to set, as print targets, all of the files selected by said selection unit and the file displayed by said second display unit.

4. The apparatus according to claim 2, wherein said setting unit further comprises a selection setting unit configured to set, as a print target, a particular one of the file selected by said selection unit and the file displayed by said second display unit.

5. The apparatus according to claim 1, wherein said extraction unit configured to detect a user who instructed to print the file selected by said selection unit based on the printing history, and extracts, as the related file, another file which the user instructed to print in the past.

6. The image forming apparatus according to claim 1, wherein said extraction unit extracts one or two files which was printed before or after the file selected by said selection unit.

7. The image forming apparatus according to claim 1, wherein the file related to the file selected by said selection unit was combined with the file selected by said selection unit and printed in the past.

8. An information processing method in an image forming apparatus which stores a printing history in a print process, comprising:
   a first display step of displaying accessible files stored in a predetermined storage;
   a selection step of selecting a file to be printed among the files displayed in the first display step;
   an extraction step of extracting, based on the printing history, a file related to the file selected in the selection step in accordance with selection of the file; and
   a printing step of printing the file selected in the selection step, and the file extracted in the extraction step.

9. The method according to claim 8, further comprising
   a second display step of displaying the file extracted in the extraction step, and
   a setting step of setting a print target file of the file selected in the selection step, and the file displayed in the second display step,
   wherein the file set in the setting step is printed in the printing step.

10. The method according to claim 9, wherein the setting step further comprises an "all setting" step of setting, as print targets, all of the file selected in the selection step and the file displayed in the second display step.

11. The method according to claim 9, wherein the setting step further comprises a selection setting step of setting, as a print target, an arbitrary file of the file selected in the selection step and the file displayed in the second display step.

12. The method according to claim 8, wherein the extraction step detects a user who instructed to print the file selected in the selection step based on the printing history, and extracts, as the related file, another file which the user instructed to print in the past.

13. A storage medium which stores a control program for causing a computer to execute an information processing method of claim 8.

14. The method according to claim 8, wherein said extraction step extracts one or two files which was printed before or after the file selected in said selection step.

15. The method according to claim 8, wherein the file related to the file selected in said selection step was combined with the file selected in said selection step and printed in the past.

* * * * *